United States Patent
Mandal et al.

(10) Patent No.: US 10,397,591 B2
(45) Date of Patent: Aug. 27, 2019

(54) PROCESSOR INSTRUCTIONS FOR ACCELERATING VIDEO CODING

(71) Applicant: Texas Instruments Incorporated, Dallas, TX (US)

(72) Inventors: Dipan Kumar Mandal, Bangalore (IN); Mihir Narendra Mody, Bangalore (IN); Mahesh Madhukar Mehendale, Bangalore (IN); Chaitanya Satish Ghone, Pune (IN); Piyali Goswami, Bangalore (IN); Naresh Kumar Yadav, Noida (IN); Hetul Sanghvi, Richardson, TX (US); Niraj Nandan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 185 days.

(21) Appl. No.: 14/684,334

(22) Filed: Apr. 11, 2015

(65) Prior Publication Data

US 2015/0296212 A1    Oct. 15, 2015

(30) Foreign Application Priority Data

Apr. 11, 2014  (IN) .......................... 1917/CHE/2014

(51) Int. Cl.
| | |
|---|---|
| *H04N 19/43* | (2014.01) |
| *H04N 19/42* | (2014.01) |
| *H04N 19/463* | (2014.01) |
| *G06F 9/38* | (2018.01) |

(52) U.S. Cl.
CPC ........... *H04N 19/42* (2014.11); *G06F 9/3885* (2013.01); *H04N 19/43* (2014.11); *H04N 19/463* (2014.11)

(58) Field of Classification Search
CPC ................................. H04N 7/25; H04N 19/60
See application file for complete search history.

(56) References Cited

U.S. PATENT DOCUMENTS

| | | | | |
|---|---|---|---|---|
| 2008/0298472 A1* | 12/2008 | Jain | ...................... | H04N 19/176 375/240.29 |
| 2011/0080947 A1* | 4/2011 | Chen | ...................... | H04N 19/13 375/240.12 |

OTHER PUBLICATIONS

Wiegand, T, Sullivan, G. J., Bjontegaard, G. & Luthra A. (2003). Overview of the H.264/AVC Video Coding Standard. IEEE Transactions on Circuits and Systems for Video Technology, (Jul. 2003) 13, 7, 560-576.*

(Continued)

*Primary Examiner* — Patricia I Young
(74) *Attorney, Agent, or Firm* — Brian D. Graham; Charles A. Brill; Frank D. Cimino

(57) ABSTRACT

A control processor for a video encode-decode engine is provided that includes an instruction pipeline. The instruction pipeline includes an instruction fetch stage coupled to an instruction memory to fetch instructions, an instruction decoding stage coupled to the instruction fetch stage to receive the fetched instructions, and an execution stage coupled to the instruction decoding stage to receive and execute decoded instructions. The instruction decoding stage and the instruction execution stage are configured to decode and execute a set of instructions in an instruction set of the control processor that are designed specifically for accelerating video sequence encoding and encoded video bit stream decoding.

19 Claims, 4 Drawing Sheets

(56) References Cited

OTHER PUBLICATIONS

Jul. 2003, Wiegand, Thomas, et al., "Overview of the H.264/AVC Video Coding Standard", 2003 IEEE Transactions on Circuits and Systems Video Technology, Jul. 2003, vol. 13, No. 7.*

Minhua Zhou and Mihir Mody, "AHG: On Slice Header Parsing Overhead Reduction", JCTVC-J0083, Joint Collaborative Team on Video Coding (JCT-VC) of ITU-T SG16 WP3 and ISO/IEC JTC1/SC29/WG11, Stockholm, Sweden, Jul. 11-20, 2012, pp. 1-33.

Mahesh Mehendale, et al, "A True Multistandard, Programmable Low-Power, Full HD Video-Codec Engine for Smartphone SoC", IEEE International Solid-State Circuits Conference Digest of Technical Papers, Feb. 19-23, 2012, San Francisco, CA, pp. 226-228.

Hetul Sanghvi, et al, "A 28nm Programmable and Low Power Ultra-HD Video Codec Engine", 2014 IEEE International Symposium on Circuits and Systems (ISCAS), Jun. 1-5, 2014, Melbourne VIC, pp. 558-561.

"Advanced Video Coding for Generic Audiovisual Services", ITU-T Recommendation H.264, Series H: Audiovisual and Multimedia Systems, Infrastructure of Audiovisual Services—Coding of Moving Video, ITU-T Telecommunication Standardization Sector of ITU, Feb. 2014, pp. 1-766.

"High Efficiency Video Coding", ITU-T Recommendation H.265, Series H: Audiovisual and Multimedia Systems, Infrastructure of Audiovisual Services—Coding of Moving Video, ITU-T Telecommunication Standardization Sector of ITU, Oct. 2014, pp. 1-518.

"ARM968E-S Technical Reference Manual", ARM Limited, Revision: r0p1, Jan. 30, 2004, updated Nov. 6, 2006, pp. 1-194.

"H264 High Profile Decoder 2.0 on HDVICP2 and Media Controller Based Platform Data Sheet", SPRS839, Texas Instruments Incorporated, Jan. 2015, pp. 1-7.

"ASIP Designer—Application-Specific Processor Design Made Easy", ASIP Brochure, Synopsys, Inc., pp. 1-4.

"Application-Specific Instruction Set Processor", Wikipedia, pp. 1-2, available at http://en.wikipedia.org/w/index.php?title=Applicationspecific_instruction_set_processor&oldid=646107354 on Feb. 7, 2015.

Jae-Jin Lee, et al, "ASIP for Multi-Standard Video Decoding", CENICS 2012: The Fifth International Conference on Advances in Circuits, Electronics and Micro-electronics, Aug. 19, 2012, Rome, Italy, pp. 37-42.

Kurt Keutzer, et al, "From ASIC to ASIP: The Next Design Discontinuity", Proceedings of the 2002 IEEE International Conference on Computer Design: VLSI in Computers and Processors, Sep. 18, 2002, pp. 84-90.

Dipan Kumar Mandal, et al, "Accelerating H.264/HEVC Video Slice Processing Using Application Specific Instruction Set Processor", Presentation, 2015 IEEE International Conference on Consumer Electronics (ICCE), Jan. 11, 2015, Las Vegas, NV, USA, pp. 1-12.

Dipan Kumar Mandal, et al, "Accelerating H.264/HEVC Video Slice Processing Using Application Specific Instruction Set Processor", 2015 IEEE International Conference on Consumer Electronics (ICCE), Jan. 9-12, 2015, Las Vegas, NV, USA, pp. 408-411.

* cited by examiner

PROCESSOR INSTRUCTIONS FOR ACCELERATING VIDEO CODING

CROSS-REFERENCE TO RELATED APPLICATIONS

This application claims priority from India Provisional Patent Application No. 1917/CHE/2014 filed on Apr. 11, 2014, which is incorporated by reference in its entirety.

BACKGROUND OF THE INVENTION

Field of the Invention

Embodiments of the present invention generally relate to video coding and more specifically relate to processor instructions designed to accelerate video coding.

Description of the Related Art

Video coding standards such as H.264/AVC and H.265 (commonly referred to as High Efficiency Video Coding (HEVC)) include an independent coding unit referred to as a slice to support low latency encoding and decoding and to provide better transmission error resiliency. The H.264 standard is described in ITU-T Recommendation H.264: Advanced Video Coding for Generic Audiovisual Services and the HEVC standard is described in ITU-T Recommendation H.265: High Efficiency Video Coding (HEVC), both of which are incorporated by reference herein.

A slice, which may be a portion of a picture or the entire picture, includes a header and payload video data. In many video streams, the slice header is relatively simple and can be decoded in real-time on a standard embedded RISC processor. However, the worst case slice headers permitted by the video coding standards are complex and real-time decoding of such headers is beyond the capacity of most embedded RISC processors. Hardwiring of slice processing control logic is potentially helpful but such hardwiring reduces the ability to tune the decoder for error conditions—an important differentiator for the end user.

SUMMARY

Embodiments of the present invention relate to systems and methods for accelerating video coding with custom (specialized) processor instructions. In one aspect, a control processor for a video encode-decode engine is provided that includes an instruction pipeline including an instruction fetch stage coupled to an instruction memory to fetch instructions, an instruction decoding stage coupled to the instruction fetch stage to receive the fetched instructions, and an execution stage coupled to the instruction decoding stage to receive and execute decoded instructions, wherein the instruction decoding stage and the instruction execution stage are configured to decode and execute a set of instructions comprised in an instruction set of the control processor, the set of instructions designed specifically for accelerating video sequence encoding and encoded video bit stream decoding.

In one aspect, a method for encoding a video sequence by a video encode-decode engine is provided that includes receiving the video sequence by a control processor in the video encode-decode engine, and encoding the video sequence to generate an encoded video bit stream, wherein instructions in a set of instructions in an instruction set of the control processor that are designed specifically for accelerating video sequence encoding are executed.

In one aspect, a method for decoding an encoded video bit stream by a video encode-decode engine is provided that includes receiving the encoded video bit stream by a control processor in the video encode-decode engine, and decoding the encoded video bit stream to generate video sequence, wherein instructions in a set of instructions in an instruction set of the control processor that are designed specifically for accelerating bit stream decoding are executed.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
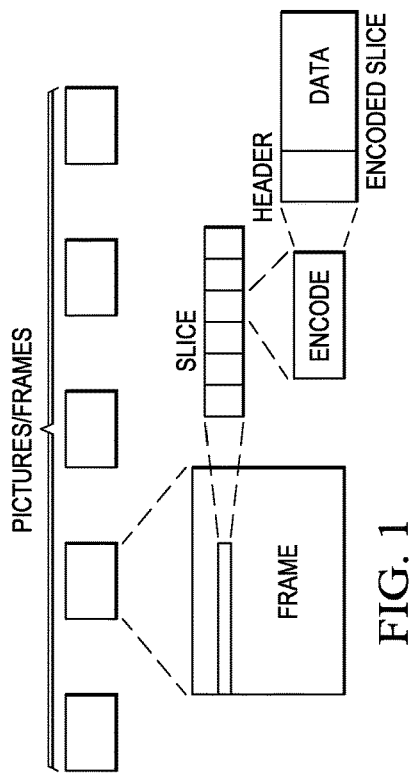
FIG. 1 is an example illustrating the structure of a slice.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments may be described herein in reference to H.264/AVC. One of ordinary skill in the art will understand embodiments of the invention for other video coding standards such as HEVC.

FIG. 1 is an example illustrating the structure of a slice in the context of a video bit stream of frames. A slice is an independently coded subset of a frame that contains an integer number of blocks of the frame. In H.264/AVC, these blocks are referred to as macroblocks and are typically 16×16. In HEVC, these blocks are referred to as largest coding units (LCUs). An LCU plays a similar role in coding as the macroblock of H.264/AVC, but it may be larger, e.g., 32×32, 64×64, etc. The independent coding of slices enables random access in a video bit stream and supports better error performance during transmission of a video bit stream.

An encoded slice includes the encoded residual data of the blocks in the slice and a header. The slice header contains parameters that are needed for decoding the blocks in the slice. These parameters may include, for example, a picture order counter, reference picture parameter sets, reference picture list parameters and modification parameters, de-blocking filter control parameters, weighted prediction tables, etc. Factors such as the number of slices in a frame, the number of active reference frames, and the presence of reference picture list parameters and chroma weighted prediction tables in a slice header lead to a large variation in the complexity of a slice header. Table 1 summarizes typical and worst case scenarios for H.264/AVC. As can be seen from this table, slice processing for a worst case H.264/AVC bit stream is much more complex than for a typical H.264/AVC bit stream.

TABLE 1

| Slice Processing Factor | Typical Case | Worst Case |
|---|---|---|
| Slices per frame | 4 | 136 |
| Number of active reference frames (sets of weighted prediction tables) | 2 sets of weights; 2 weight values per prediction direction; 4 weights for a B slice | 16 sets of weights; 2 weight values per prediction direction; 32 weights for a B slice |
| Chroma weighted prediction tables | Weights are used for luma only | Weights are used for both luma and chroma, with different weights for Cb and Cr |
| Reference picture list parameters | Not present in slice header | Present in every slice header |

A compliant decoder is required to handle the worst case scenario in real-time. Further, slice header processing is typically implemented in software executed by a general purpose embedded processor. Table 2 shows cycle estimates for slice header parsing for H.264/AVC and HEVC at 1080p@30 assuming that the slice header decoding operation is implemented in software on an ARM968E-S™ processor with zero-wait-state local program and data memory. The ARM968 processor is used as it is an example of a processor core of choice for use in a video encode-decode engine. Additional information regarding this processor is available, for example, in "ARM968E-S™ Technical Reference Manual", ARM Limited, 2004, 2006. Table 2 shows that there are approximately 13× and 7× differences, respectively, between the typical and worst case slice header parsing/decoding time for H.264/AVC and HEVC. Handling such worst case scenarios in real time may be beyond the capacity of a pure software implementation on RISC processors typically used in embedded applications.

TABLE 2

| | H.264/AVC | | HEVC (HM7.0) | |
|---|---|---|---|---|
| | Typical | Worst | Typical | Worst |
| Performance Factors | | | | |
| Decoded Picture Buffer (DPB) size (#frames) | 4 | 4 | 6 | 6 |
| Number of active reference frames | 2 | 16 | 2 | 16 |
| Chroma weights? (0->no, 1>yes) | 0 | 1 | 0 | 1 |
| Reference picture list? (0->no, 1>yes) | 0 | 1 | 0 | 1 |
| Slice Type (2->B slice) | 2 | 2 | 2 | 2 |
| Number of slices per frame | 4 | 136 | 4 | 65 |
| Frame rate (fps) | 30 | 30 | 30 | 30 |
| Performance (Cycles) | | | | |
| Basic slice header parsing | 9000 | 9000 | 9500 | 9500 |
| Weighted prediction tables parsing | 0 | 35120 | 0 | 35120 |
| Reference picture list modification parsing | 0 | 9160 | 0 | 7460 |
| Reference picture selection parsing | 0 | 4420 | 0 | 4420 |
| Reference picture re-ordering (operation) | 0 | 54400 | 0 | 3200 |
| Total Cycles (one slice header) | 9000 | 112100 | 9500 | 59700 |
| | 1x | 13x | 1x | 7x |

Figure 2:
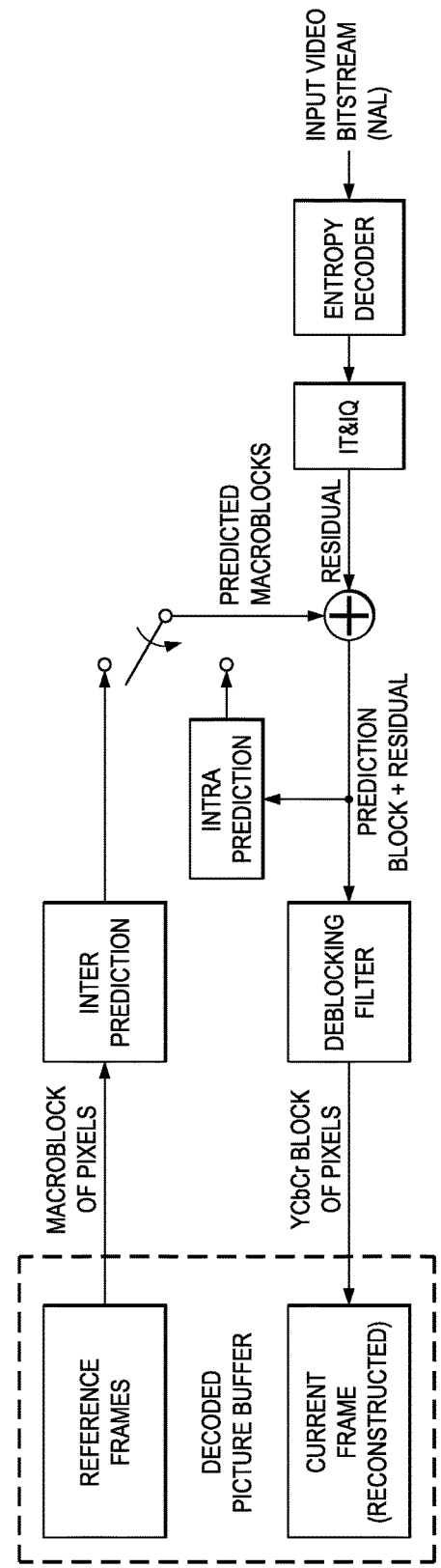
FIG. 2 is a block diagram of an example video decoder.
Figure 3:
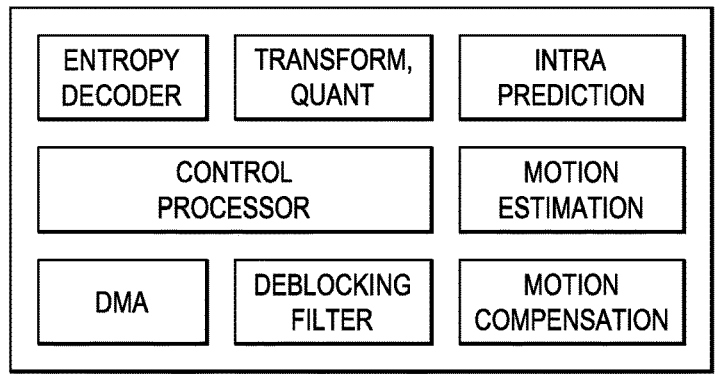
FIG. 3 and FIG. 4 are block diagrams of prior art video encode-decode engines.

FIG. 2 is a block diagram of an example H.264/AVC decoder illustrating the typical processing performed to decode a video bit stream, i.e., inter-prediction, intra-prediction, de-blocking filtering, entropy decoding, inverse transformation and inverse quantization. In a typical embedded video encode-decode (codec) engine, most of this processing is performed by dedicated hardwired engines (hardware accelerators) under the control of software executing on a central embedded RISC processor such as the ARM968 processor. A block diagram of such a video codec is shown in FIG. 3. The video codec includes an entropy decoder component, a transform/quantization component, an intra-prediction component, a motion estimation component, a motion compensation component, and a deblocking filter component. The video codec also includes a direct memory access (DMA) component. In such a codec, the control processor executes software to perform the slice header decoding and to manage the decoding of the encoded video data in each slice by the various components. As previously mentioned, decoding slice headers in real-time for the worst case scenario may be beyond the capacity of such a codec.

Figure 4:
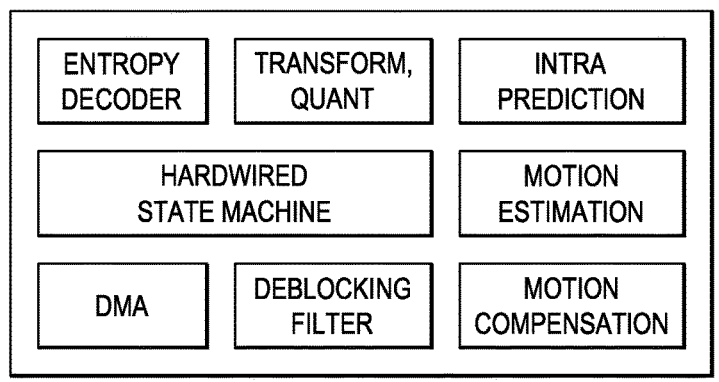

One possible approach to accelerate slice header processing in an embedded video codec is to use a more powerful processor. However, such an approach may increase the size and the dynamic power consumption of the codec to unacceptable levels for many embedded applications. Another possible approach, as illustrated in FIG. 4, is to replace the control processor with dedicated hardwired logic such as the depicted state machine. However, the logic may be complex to design and verify and provides no programmability.

Embodiments of the invention provide for accelerated video coding such as, for example, slice header decoding, bit stream parsing, and bit stream generation, using processor instructions specifically designed to accelerate selected video coding operations performed by the control processor. As is explained in more detail herein, these video coding specific instructions accelerate slice header processing for both decoding and encoding as well as other video coding processing performed by a control processor. Using these instructions may not only accelerate processing of typical slice headers but may also enable real time processing of the worst case scenario.

Figure 5:
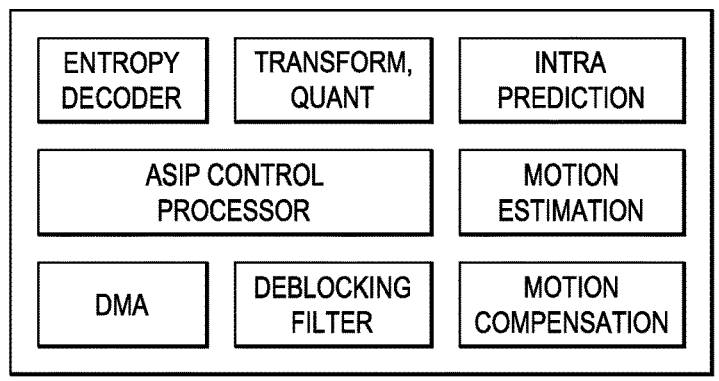
FIG. 5 is a block diagram of a video encode-decode engine with an application specific instruction set processor (ASIP) as the control processor.

In some embodiments, an application specific instruction set processor (ASIP) with custom instructions for video coding is used as the control processor in an embedded video codec. Such an embedded video codec is illustrated in the block diagram of FIG. 5. In general, an ASIP is a processor designed for an application domain through the addition of specialized, i.e., custom, instructions tailored for the benefit of that application domain. The custom instructions may be specifically designed to accelerate computationally intensive functions and/or the most used functions of the application domain. An ASIP may include a processor with a base instruction set and custom hardware for executing the custom instructions.

Figure 6:
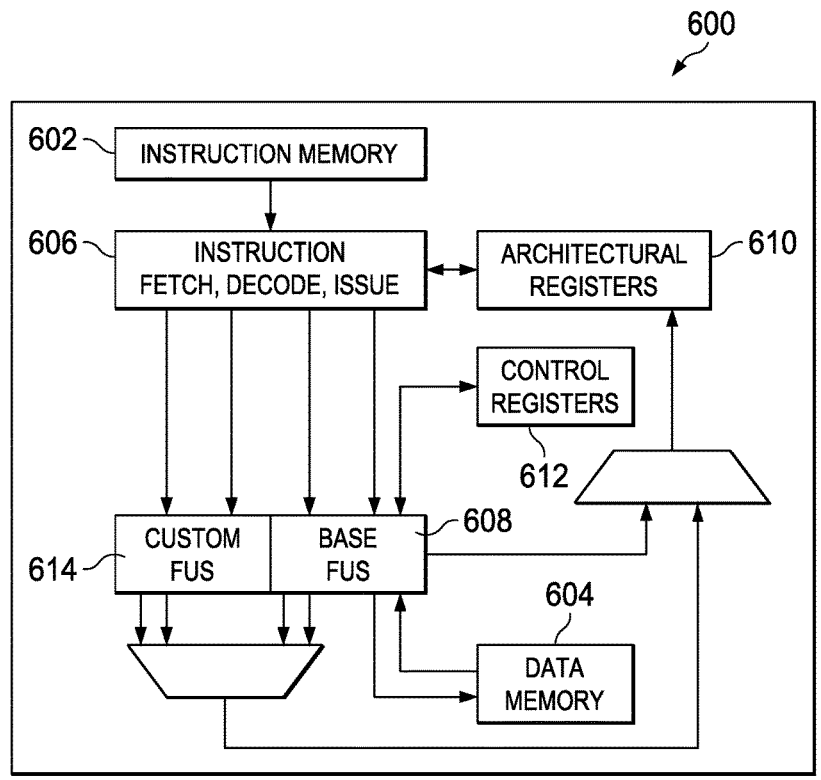
FIG. 6 is a block diagram of an example ASIP with custom instructions for accelerating video coding.

FIG. 6 is a simplified block diagram of an example ASIP 600 with custom instructions for accelerating video coding. The base processor of the depicted ASIP is a 32-bit Application specific RISC Processor (ARP32) available from Texas Instruments, Inc. ARP32 refers to a family of customizable embedded processors targeted for embedded control applications such as embedded video processing. The processing core may be augmented with application specific (custom) instructions to form an application specific variant to the ARP32 processor. In this embodiment, the ARP32 processing core is augmented with custom instructions that may be used to accelerate some aspects of video bit stream processing, both for decoding and encoding.

The ARP32 600 is a 32-bit RISC processor with tightly coupled, zero wait state instruction memory 602 and data memory 604. The ARP32 600 implements a single issue, shallow pipeline that includes a merged instruction fetch, decode and issue stage, an execute stage, and a write back to memory stage. The merged instruction fetch, decode, and issue stage is provided by the instruction fetch, decode, issue component 606. The execute stage is provided by the custom instruction functional units 614 or the base instruction functional units 608, depending on whether the decoded instruction is a custom instruction or an instruction in the base ISA. The base functional units 608 include a functional unit for logical operations and some bit operations, a functional unit for move operations, a functional unit for arithmetic operations such as compare, address calculation, and stack pointer management, and a functional unit for multiplication, division, and modulo operations. The custom functional units 614 implement datapath logic for custom instructions. The ARP32 600 implements a small, powerful set of base instructions and is supported by an optimizing C/C++ compiler, code generation tools, a source code debugger, etc. The base instruction set architecture and pipeline are optimized for high performance in control code with low silicon area and power dissipation.

The ARP32 600 supports custom instructions that can read up to two source operand registers and produce a result to be written to one destination register. The source and destination operand registers may be any of the architectural registers. All custom instructions are decoded within the ARP32 core, i.e., by the instruction fetch, decode, issue component 606. All relevant pipeline control and protection operations such as source operand dependency check, data forwarding from previous instruction, etc., are applicable to a custom instruction as to any other instruction of the base ISA.

The architectural registers 610 are read for source operands for instructions in the base ISA and custom instructions at the end of the instruction fetch and decode and are written back at the end of the execute stage. In addition, for load instructions, the memory read data is written back to the architectural registers 610 at the end of the write back stage. For store instructions, the architectural registers 610 are read for write date at the execute stage.

The control registers 612 include registers which control or report status for the ARP32 processor. These registers include an interrupt enable register, an interrupt set register, a nonmaskable interrupt return address register, a maskable interrupt return address register, loop start address and iteration count registers, a decode program counter register, etc.

The task of handling computationally intensive data processing (often combined with embedded control decisions) of a video codec control processor is left for custom instructions implemented by custom functional units 614. The ARP32 600 provides a hardware interface for addition of custom instructions for a particular application. Further, associated compiler tools provide for the addition of interfaces to the custom instructions, referred to as custom intrinsic functions herein, which allow programmers to generate programs using the custom instructions.

The custom functional units 614 include memory mapped registers (not shown) that store configuration parameters and status information of the custom functional units 614. The configuration parameters include, for example, a start code pattern and parameters for buffer management such as a circular buffer start address, memory page size, and the number of pages in the circular buffer. The status information includes, for example, the current position of the bit stream pointer in the circular buffer, the external memory address where a next byte of a bit stream is to be read (decoder) or written (encoder), and a cumulative count of memory pages consumed (decoder) or written (encoder).

Table 3 shows example custom intrinsic functions implemented by the compiler for the ARP32 600. These custom intrinsic functions may either be compiled directly to corresponding single custom instructions implemented by the custom functional units 614 or to short instruction sequences that include a corresponding single custom instruction. In other words, for each custom intrinsic function, there is a custom instruction that implements the functionality described in the table. This is not to say that there is necessarily a one-for-one mapping between the custom intrinsic functions and the custom instructions. Note that the custom intrinsic functions that access data from a bit stream are used for decoding and the custom intrinsic functions that insert data in a bit stream are used for encoding.

TABLE 3

| Custom Intrinsic Functions | Brief Description |
| --- | --- |
| _Config( ) | Used in decoding to configure the custom functional units for bit stream parsing and in encoding to configure the custom functional units for bit stream encoding |
| _Search_SC( ) | Start searching for next Start Code pattern or non-zero byte from the current position in the bit stream. |
| _Search_NZ( ) | |
| _Show_Bits(n) | Returns zero-extended "n" bits (1 to 32) from the current position in the bit stream. The current position in the bit stream is not modified. |
| _Read_Bits(n) | Returns zero-extended "n" bits from the current position in the bit stream. The current position in the bit stream is modified. |
| _Flush_Bits(n) | Discard/Remove "n" bits from the current position in the bit stream. When n = 255, the current position in the bit stream, is moved to the next byte boundary in the bit stream. |
| _Read_SGlmb( ) | Returns the decoded Signed-Golomb value from the current position in the bit stream. The current position in the bit stream is modified. |
| _Read_UGlmb( ) | Returns the decoded Unsigned-Golomb value from the current position in the bit stream. The current position in the bit stream is modified. |
| _Write_SC( ) | Inserts a configured Start Code pattern in the bit stream and updates the current position in the bit stream. If the position in the bit stream is not byte aligned, 0's are inserted to force byte alignment before the Start Code pattern is inserted. |
| _Write_Bits(n, Value) | Inserts the least significant "n" bits of "Value" in the bit stream and updates the current position in the bit stream. |
| _Write_SGlmb(Value) | Inserts the Signed-Golomb code of "Value" in the bit stream and updates the current position in the bit stream. |
| _Write_UGlmb(Value) | Inserts the Unsigned-Golomb code of "Value" in the bit stream and updates the current position in the bit stream |

The custom intrinsic functions (and corresponding custom instructions) are designed, for example, to be used in lieu of common loop intensive operations in decoding and encoding and/or to accelerate common operations such as exponential Golomb decoding and encoding, bit stream parsing, and bit stream generation. Further, bit stream pointers and bit stream buffering are managed by the custom functions.

Some examples of the use of these custom intrinsic functions are now presented. In H.264/AVC, encoded video data is organized into network abstraction layer (NAL) units, each of which is effectively a packet that contains an integer number of bytes. Each NAL unit in an encoded bit stream is prefixed with a three byte start code 'b000001). Searching for these start codes is a common software-implemented operation performed by a control processor that takes significant processing cycles. In typical implementations, a bit stream parser operates on a circular buffer in local memory, which is based on a double buffer model in which the parser works on one buffer while a DMA is filling the other buffer with new data from external memory.

Table 4 show example pseudo code for a start code search using such a double buffering model. In this pseudo code, Buffer A and Buffer B are the two buffers. Note that this pseudo code has to be aware of crossing the boundary between the two buffers and trigger the next DMA load of the empty buffer when the end of the current buffer is reached. Table 5 shows example pseudo code for a start code search using custom intrinsic functions. The custom intrinsic instruction_Search_SC( ) handles all DMA triggers related to multiple buffering and the boundary checks.

TABLE 4

```
< Trigger Load to Buffer A >
< Trigger Load to Buffer B >
< Wait for Buffer A to be available to CPU >
// Start: Bit Stream Parsing in Buffer A
    CurrWord = Read32Bits;
    NextWord = Read32Bits;
    BitsLeft = 32;
    do
    {
        CurrWord = CurrWord << 8;
        CurrWord |= (NextWord & 0xFF);
        NextWord >>= 8;
        BitsLeft -= 8;
        If (BitsLeft == 0)
        {
            If (Buffer A/B boundary crossed)
            {
                Initiate next load for Buffer A/B
            }
            NextWord = Read32Bits;
            BitsLeft = 32;
        }
    } while ((CurrWord & 0xFFFFFF00) != 0x100)
< Trigger next decoder module >
```

TABLE 5

```
// Set Parameters
'Number of Buffer' = 2 // double buffering
'Local Memory Address'
'External Memory Address'
// Call custom instructions via intrinsic(s)
__Config( ) // Set configuration
__Search__SC( ) // Do StartCode Search
<Trigger next decoder module>
```

In another example, exponential Golomb encoding and decoding (both signed and unsigned) are frequently used operations in video encoding and decoding. Table 6 shows example pseudo code for implementing the unsigned exponential Golomb decoding. In this pseudo code, the function GetBits( ) needs to handle buffer boundary crossings when multiple buffering is used. The pseudo code for signed exponential Golomb decoding would be similar and also use the function GetBits( ). Table 7 shows example pseudo code for this operation using the custom intrinsic function for decoding an unsigned Golomb value from the bit stream. This custom intrinsic instruction handles all DMA triggers related to multiple buffering and the boundary checks. The pseudo code for signed exponential Golomb decoding would use the custom intrinsic function for decoding a signed Golomb value, which also handles all DMA triggers related to multiple buffering and the boundary checks.

TABLE 6

```
DecodeUnsignedGolomb ( )
{
    Zeros = 0;
    while (0 == GetBits( )) // GetBits( ) gets next
                            // 32b in the bitstream
        Zeros++;
    Value = 1 << Zeros;
    GetBits( );
    for (i = Zeros-1; i >= 0; i--)
    {
        Value |= GetBits( ) << i;
    }
    return (Value-1);
}
```

TABLE 7

```
Set Parameters;
Set Config;
__Read__UGolomb( );
```

Table 8 shows example pseudo code for implementing the unsigned exponential Golomb encoding. In this pseudo code, the function WriteBits( ) needs to handle buffer boundary crossings when multiple buffering is used. The pseudo code for signed exponential Golomb encoding would be similar and also use the function WriteBits( ). Table 9 shows example pseudo code for this operation using the custom intrinsic function for encoding an unsigned Golomb value in the bit stream. This custom intrinsic instruction handles all DMA triggers related to multiple buffering and the boundary checks. The pseudo code for signed exponential Golomb encoding would use the custom intrinsic function for encoding a signed Golomb value, which also handles all DMA triggers related to multiple buffering and the boundary checks.

TABLE 8

```
EncodeUnsignedGolomb(value)
{
    M= floor(log2(value+1))
    WriteBits(M, 0)
    WriteBits (1,1)
    r = value - (2^M -1)
    WriteBits (M,r)
}
```

TABLE 9

```
Set Parameters;
Set Config;
__write__UGolomb(value);
```

Figure 7:
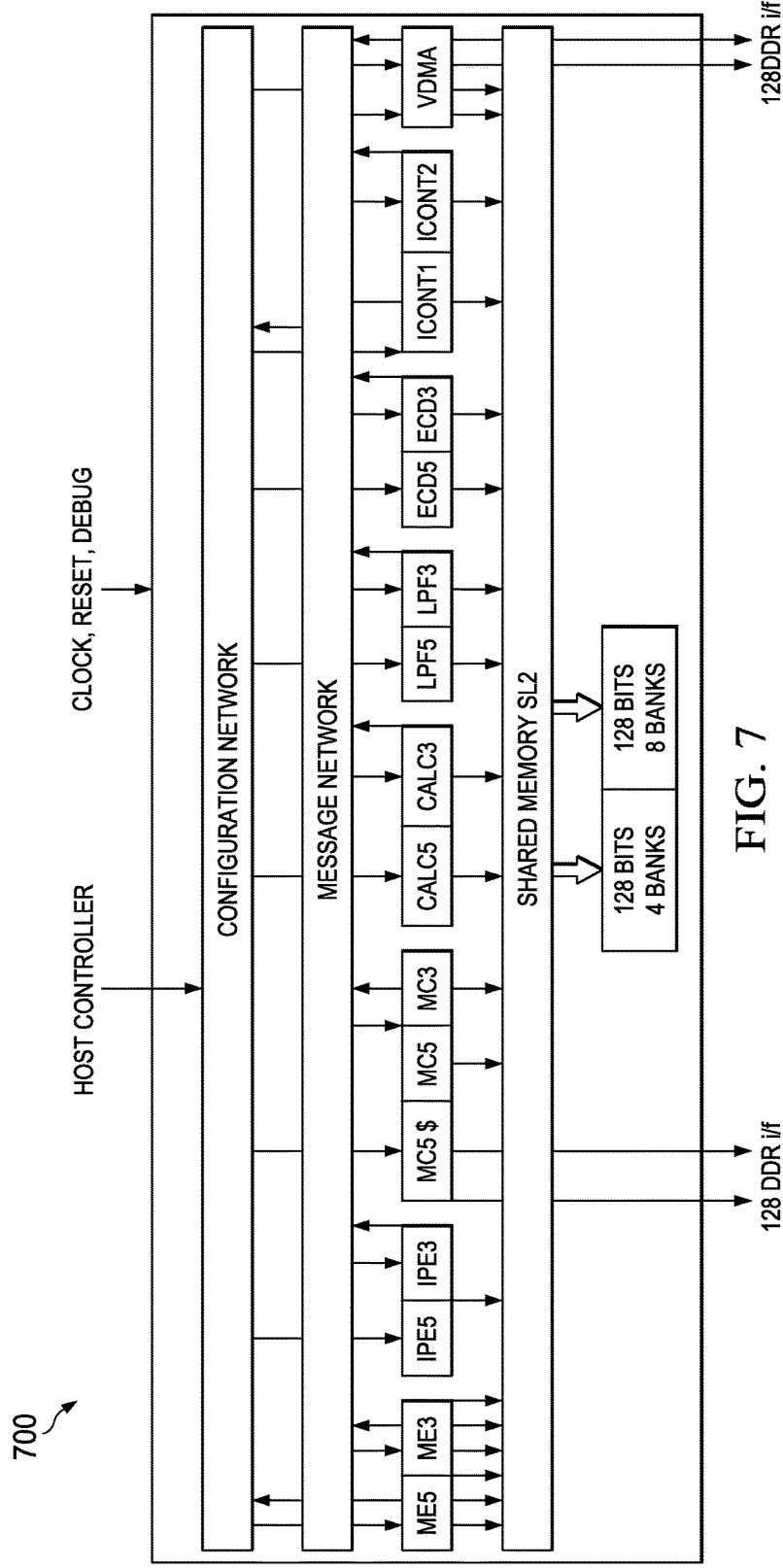
FIG. 7 is a block diagram of an example video encode-decode engine incorporating a control processor with custom instructions for accelerating video coding.

FIG. 7 is a simplified block diagram of an example video encode-decode (codec) engine 700 incorporating a control processor with custom instructions for accelerating video coding. This example video codec engine is the IVA-HD2 (Image Video Accelerator-High Definition) used by Texas Instruments in many system-on-a-chip (SOC) designs. A brief description of the video codec engine 700 is provided herein. The engine is described in more detail in H. Sanghvi, et al., "A 28 nm Programmable and Low Power Ultra-HD Video Codec Engine," Proceedings of the IEEE International Symposium on Circuits and Systems, ICAS 2014, June 2014, pp. 558-561, which is incorporated by reference herein.

The codec engine 700 includes the following hardware accelerators (HWA): motion estimation (ME) accelerators, intra prediction (IPE) accelerators, motion compensation (MC) accelerators, de-blocking filter accelerators (LPF), transform and quantization engines (CALC), and entropy codecs (ECD). The codec engine 700 also includes a video DMA engine (VDMA) optimized for two dimensional block transfers needed for video processing.

The overall dataflow control among the HWAs and interaction with an external CPU host is managed by two specialized video RISC processors (ICONT1/2). The control processor ICONT2 is present to provide compatibility with IVA-HD1 codecs. The control processor ICONT1 includes an ASIP based on the ARP32 with customized instructions for accelerating video coding such as those described herein. In addition to control and configuration of the HWAs for encoding or decoding, these control processors are responsible for, for example, slice header encoding and decoding and preparation of configuration parameters for subsequent macroblock encoding or decoding.

Inside the codec engine 700, there is also a shared Level-2 memory (SL2) for sharing pixel and control data between the HWAs. This memory also acts as a data buffer to store pixel and control data that is fetched by the VDMA from external memory or is to be stored by the VDMA in external memory. The message network is a low latency communication network that is used to indicate macroblock level task completion between HWAs. This indication is used to synchronize the timing for exchanging data between the HWAs via SL2. The configuration network provides connectivity between two external host processors, the two control processors ICONT1/2, the HWAs, the VDMA, and other local modules not specifically shown. This network is used by ICONT1/2 and the external host processors to configure the HWAs for different codec and frame level parameters.

Figure 8:
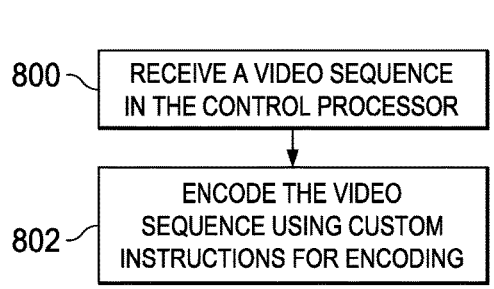
FIG. 8 and FIG. 9 are flow diagrams of methods.

FIG. 8 is a flow diagram of a method for encoding a video sequence in a video encode-decode engine having a control processor with custom instructions for accelerating video coding. As shown in FIG. 8, the control processor receives 800 a video sequence. The video sequence is then encoded 802 in the video encode-decode engine under control of the control processor to generate an encoded bit stream. As the video sequence is encoded, custom instructions of the control processor (see Table 3) for generating the encoded bit stream are executed by the control processor.

Figure 9:
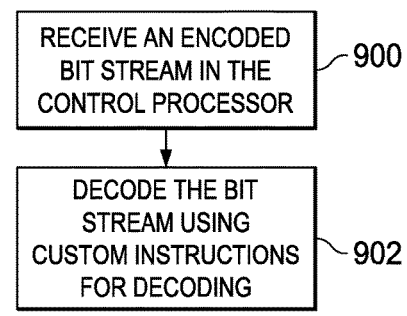

FIG. 9 is a flow diagram of a method for decoding an encoded video bit stream in a video encode-decode engine having a control processor with custom instructions for accelerating video coding. As shown in FIG. 9, the control processor receives 900 an encoded video bit stream. The bit stream is then decoded 902 in the video encode-decode engine under control of the control processor to generate a video sequence. As the bit stream is decoded, custom instructions of the control processor (see Table 3) for parsing the encoded bit stream are executed by the control processor.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which the control processor in a video codec engine is an ARP32 processor with custom instructions for accelerating video coding. One of ordinary skill in the art will understand embodiments in which other ASIPs with such custom instructions may be used. For example, suitable ASIPs and design tools for designing custom instructions can be developed using technology from companies such as Synopsys, Inc., and Cadence Design Systems, Inc. Further, companies such as these also have technology to auto-generate software tools such as compilers, linkers, and simulators based on the custom instructions.

In another example, embodiments have been described herein in which the control processor implements custom instructions for accelerating both encoding of a video sequence and decoding of an encoded video bit stream. One of ordinary skill in the art will understand embodiments in which a control processor is used in a video encode engine and implements the custom encode instructions or is used in a video decode engine and implements the custom decode instructions.

In another example, one of ordinary skill in the art will understand that embodiments may be implemented in many types of instruction processors other than ASIPs. For example, the custom instructions may be implemented in an instruction processor such as a microprocessor, a microcontroller, a reduced instruction set computer (RISC), a digital signal processor (DSP), etc. Furthermore, an instruction processor may be implemented using various types of control logic, such as: microcode, hardwired state machines, programmable logic functions, hardwired control logic, etc.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the invention.

What is claimed is:

1. A processor for video decoding with video specific instructions, the processor to receive an encoded video bit stream, the processor comprising:

an instruction memory storing an instruction set comprising a first instruction;

an instruction fetch stage coupled to the instruction memory, the instruction fetch stage to fetch the first instruction from the instruction memory; and a functional unit coupled to the instruction fetch stage, the functional unit to implement datapath logic for the first instruction to decode the encoded video bit stream, to produce a video sequence instruction to search for a next start code in the encoded video bit stream starting from a current position in the encoded video bit stream, the next start code corresponding to a code of two or more bytes that is prefixed to a network abstraction layer (NAL) unit.

2. The processor of claim 1, wherein a second instruction in the instruction set returns a decoded signed Golomb value from a current position in the encoded video bit stream.

3. The processor of claim 1, wherein a second instruction in the instruction set returns a decoded unsigned Golomb value from a current position in the encoded video bit stream.

4. The processor of claim 1, wherein a second instruction in the instruction set returns a specified number of bits from a current position in the encoded video bit stream.

5. The processor of claim 1, wherein a second instruction in the instruction set discards a specified number of bits from a current position in the encoded video bit stream.

6. A method for video encoding with video specific instructions, the method comprising:
receiving, by a processor, a video sequence;
fetching, by an instruction fetch stage of the processor from an instruction memory, a first instruction and a second instruction of an instruction set; and
encoding, by a function unit of the processor, the video sequence, to produce an encoded video bit stream, wherein the encoding includes:
using the first instruction in the instruction set to:
produce an exponential Golomb bit sequence from a specified value; and
insert the exponential Golomb bit sequence at a current position in the encoded video bit stream; and
using the second instruction to insert a start code in the encoded video bit stream corresponding to a code of two or more bytes that is prefixed to a network abstraction layer (NAL) unit.

7. The method of claim 6, wherein the exponential Golomb bit sequence is a signed exponential Golomb bit sequence.

8. The method of claim 6, wherein the exponential Golomb bit sequence is an unsigned exponential Golomb bit sequence.

9. The method of claim 6, wherein a third instruction in the instruction set inserts a specified number of bits at a current position in the encoded video bit stream.

10. A method for video decoding with video specific instructions, the method comprising:
receiving, by a processor, an encoded video bit stream;
fetching, by an instruction fetch stage of the processor from an instruction memory, a first instruction of an instruction set; and
decoding, by a functional unit of the processor, the encoded video bit stream to produce a video sequence, using the first instruction in an instruction set of the processor, the first instruction to search for a next start code in the encoded video bit stream starting from a current position in the encoded video bit stream, the next start code corresponding a code of two or more bytes that is prefixed to a network abstraction layer (NAL) unit.

11. The method of claim 10, wherein decoding the encoded video bit stream further comprises using a second instruction in the instruction set, wherein the second instruction returns a decoded signed Golomb value from a current position in the encoded video bit stream.

12. The method of claim 10, wherein decoding the encoded video bit stream further comprises using a second instruction in the instruction set returns a decoded unsigned Golomb value from a current position in the encoded video bit stream.

13. The processor of claim 1, further comprising an instruction decoding stage coupled to the instruction fetch stage to decode the first instruction.

14. The processor of claim 1, wherein the processor is a 32 bit application specific reduced instruction set computer (RISC) processor.

15. The processor of claim 1, wherein the instruction memory is a tightly coupled, zero wait state instruction memory.

16. The processor of claim 1, wherein the processor is an application specific instructions processor (ASIP).

17. The processor of claim 1, wherein the functional unit is a custom functional unit and the first instruction is a first custom instruction.

18. The method of claim 6, wherein the processor is an application specific instructions processor (ASIP).

19. The method of claim 6, wherein the functional unit is a custom functional unit and the first instruction is a first custom instruction.

* * * * *